April 29, 1969    D. D. HANDLEY    3,441,153
MODIFIED FLAT BED TRUCK
Filed May 11, 1967
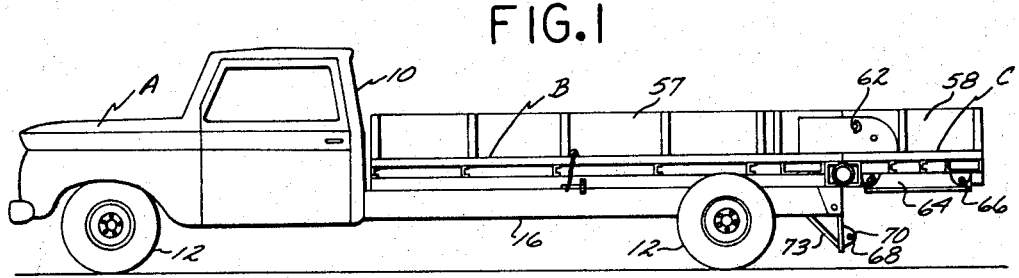
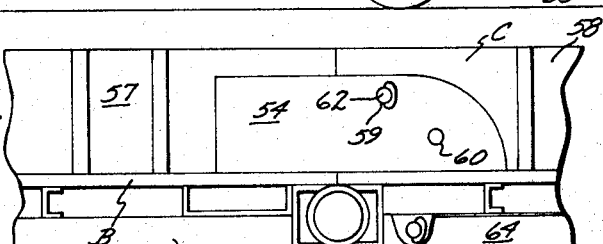
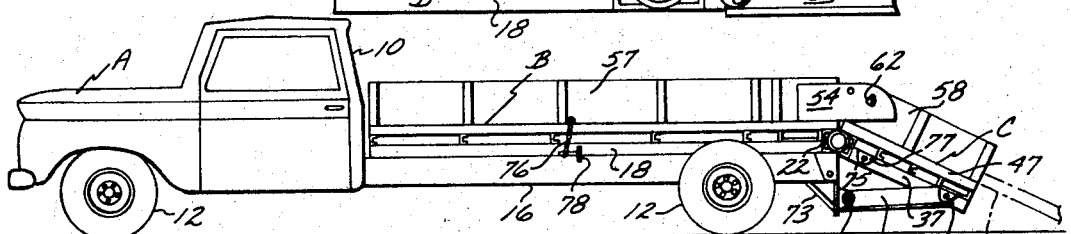
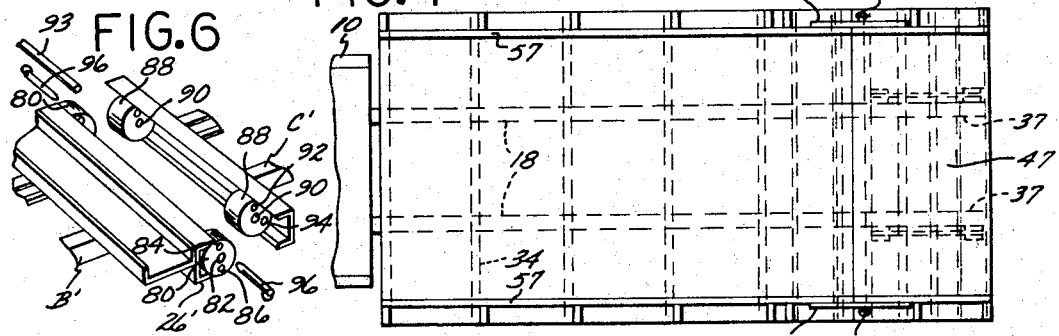
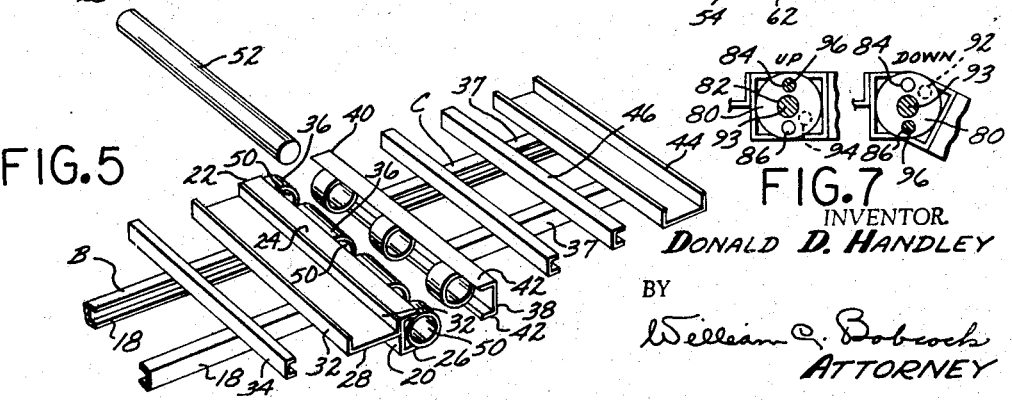
INVENTOR.
DONALD D. HANDLEY
BY
William C. Babcock
ATTORNEY United States Patent Office 3,441,153
Patented Apr. 29, 1969

3,441,153
MODIFIED FLAT BED TRUCK
Donald D. Handley, 4800 Walnut Ave.,
Long Beach, Calif. 90807
Filed May 11, 1967, Ser. No. 637,777
Int. Cl. B60p *1/00;* B62d *33/02, 25/20*
U.S. Cl. 214—85                                       6 Claims

ABSTRACT OF THE DISCLOSURE

A flat bed truck which has been modified to include a bed extension that may be removably locked in either a horizontal position or in a downwardly and rearwardly extending position wherein it serves as a ramp to permit specialized power construction equipment to be driven thereover in loading the same or unloading of equipment from the truck vehicle.

BACKGROUND OF THE INVENTION

Field of the invention

Modified flat bed truck that may be used for the normal purposes for which conventional flat bed trucks are employed, as well as for hauling specialized construction equipment from one job site to another.

Description of the prior art

In the construction business it is often necessary for sub-contractors to transport specialized pieces of equipment for use on a particular job, such as power-driven hoes, and the like, on a truck to and from the job site. Trucks used for such purposes are normally of special design, and can rarely be used for other than its intended purpose. However, sub-contractors could, in many instances, rent a flat bed truck to the general contractor on an hourly basis if such a vehicle is available on the job site, whereby over a period of time his income is substantially increased.

The present invention provides a modified flat bed truck adapted to be used on a job site for the same purposes as a conventional flat bed truck after the modified vehicle has been used to transport specialized equipment to a job site.

SUMMARY OF THE INVENTION

A modified flat bed truck incorporating a bed extension pivotally supported from the rear of the bed, which extension is selectively lockable in either a horizontal position or in a downwardly and rearwardly extending position wherein it serves as a ramp over which specialized construction equipment may be driven to load the same on or remove it from the vehicle.

A major object of the invention is to furnish an improved flat bed truck of simple mechanical structure that permits the rapid and safe loading of self-motivated specialized construction equipment thereon.

Yet a further object of the invention is to provide an improved flat bed truck in which the improved portion thereof can be fabricated from standard, commercially available equipment and materials, and one which can be retailed at a sufficiently reasonable price as to encourage the widespread use thereof.

BRIEF DESCRIPTION OF THE DRAWING

FIGURE 1 is a side elevational view of a conventional flat bed truck that has been modified to include a pivotally movable rear portion, which when locked in a horizontal position, defines a part of the flat bed;

FIGURE 2 is an enlarged fragmentary side elevational view of the rear of the truck;

FIGURE 3 is the same side elevational view of the improved truck shown in FIGURE 1 illustrating the rear portion of the flat bed thereof after it has been moved into an equipment loading and unloading position;

FIGURE 4 is a top plan view of the truck;

FIGURE 5 is a perspective view of the pin and associated structure used for maintaining the pivotal portion of the bed in a desired position;

FIGURE 6 is a perspective view of a first alternate form of the device; and

FIGURE 7 is a side elevational view of the alternate form of the device which supports the bed extension horizontally as well as in an angular position.

DESCRIPTION OF THE PREFERRED EMBODIMENTS

In FIGURE 1 a conventional truck A is shown which includes a cab 10, wheels 12, and chassis 16. The chassis 16 is of conventional rectangular open frame construction.

A bed structure B is disposed above the chassis 16, as best seen in FIGURES 2 and 5, and includes two parallel, laterally spaced, rearwardly extending members 18 of substantial strength. The rear ends of members 18 abut against the web 20 of a transversely positioned structural channel 22 including an upper horizontal flange 24 and lower flange 26. Flange 26 is welded or otherwise secured to the upper rear surfaces of chassis 16. A wide channel 28 which includes a web 30 and flanges 32 is situated forwardly of channel 22. Web 30 is welded or otherwise secured to channel 22. A number of longitudinally spaced, transversely positioned, reinforcing members 34 are secured to the upper surfaces of members 18 by welding, or the like. A rectangular flat surface or bed 35 (FIGURE 3) is secured to the flange 24 and the upper surface of the members 34 by conventional means. Four transversely aligned and spaced first tubular sections 36 are secured to the rear of channel 22, as best shown in FIGURE 5. A bed extension C that is pivotally adjustable relative to the bed structure B is provided which is situated rearwardly therefrom.

Bed extension C includes two laterally spaced, parallel members 37 which are preferably longitudinally aligned with members 18. The forward ends of members 37 abut against, and are secured to a web 38 of a second structural channel 40 provided with two forwardly extending flanges 42. A wide transverse channel 44 is secured to the upper surface of the members 37 on the rear ends thereof (FIGURE 5). A rectangular bed extension 47 is secured to the upper portions of channels 40 and 44, and additional transverse reinforcing members 46 that are affixed to the members 37, as illustrated in FIGURE 3.

Three transversely aligned and spaced apart second tubular sections 48 are affixed to the forward portion of channel 40, and are of such length as to be insertable in spaces 50 defined between first tubular sections 36. When sections 36 and 48 are in transverse alignment they are engaged by a heavy pin 52 of circular transverse cross section. Due to the above structure, the bed extension C can be pivoted relative to the bed B, as shown in FIGURE 3.

Two parallel, laterally, upwardly extending heavy plates 54 are secured to the rear side portions of the bed surface 35. As illustrated in FIGURES 1–3 inclusive, the plates 54 also extend rearwardly from the bed surface 35, which surface is provided with low side walls 57 which extend upwardly from the longitudinal edges thereof. The bed extension C has side walls 58 that are rigidly secured by conventional means to the bed extension 47.

Two pairs of transversely aligned openings 59 and 60 are formed in plates 54, and they may be aligned with a pair of openings (not shown) in the walls 58. The openings 59 and 60 and the openings (not shown) in the walls 58 may be engaged by a pair of pins 62. When the openings 59 and those (not shown) in walls 58 are engaged by pins 62, the bed extension C is held in the horizontal position shown in FIGURE 1. On the other hand, when the pins 62 engage the opening 60 and the openings (not shown) in walls 58, they serve to partially secure the bed extension C in the angular position shown in FIGURE 3.

Two legs 64 of heavy construction are pivotally secured by pins 66 from the external surface of the members 37. Openings (not shown) are formed in forwardly disposed positions in legs 64, and these openings may be aligned with openings 68 provided in two rearwardly extending lugs 70 that are secured to brackets 73. The brackets 73 are preferably triangular, and are secured to the rear under portion of the chassis 16 by welding or the like. The openings 68 and openings (not shown) in legs 64 can be removably engaged by pins 72 to permit the legs to support the bed extension C in the downwardly and rearwardly extending position shown in FIGURE 3. When the bed extension C is disposed in the downwardly and rearwardly position, planks 74, or other elongate, rigid members, can be removably supported in an angular position to permit a power-driven piece of equipment such as a tractor, hoe, or the like to be run up over the planks and bed extension C onto the bed B to be thereafter transported to any new location.

A tie-down chain 76 is provided that extends transversely across the bed B, and by use of a conventional winch 78, the chain may be tightened to hold the power equipment being transported in fixed position on the truck bed. After the power equipment (not shown) has been mounted on the bed B, the pins 72 and 62 are removed from the positions they occupy in FIGURE 3, with the pins 62 then being mounted in the openings 58 and the openings (not shown) in walls 56.

The legs 64 are then pivoted upwardly to lie in substantially the same plane as the members 37. Legs 64 are so held by the pins 72 when extended through openings 75 in lugs 77, and the forwardly disposed openings (not shown) in the legs. The lugs 77 occupy fixed positions relative to members 37. When it is decided to position the bed extension C in the manner shown in FIGURE 3 to unload a piece of power equipment from the bed structure B, the above described operation is simply reversed.

The lowermost of the flanges 42 is narrower in width than the upper flange 42, as can best be seen in FIGURE 5, to permit the bed extension C to be pivoted downwardly to the position shown in FIGURE 3, without the lowermost flange 42 interfering with this operation by coming into contact with the flange 26.

An alternate form of the invention is shown in FIGURES 6 and 7, in which a transverse channel 26' is formed in the rear of a flat truck bed B' and supports two laterally spaced circular bodies 80, through the center of which aligned bores 82 extend.

Also aligned bores 84 and 86 are formed in bodies 80 above and below the bores 82. Two circular bodies 88 are mounted on the forward portion of a bed extension C', and are so arranged that they are disposed adjacent to bodies 80. Bodies 88 have centrally disposed bores 90 formed therein that are in alignment with bores 82. The bores 82 and 90 are engaged by a rod 93 to pivotally support bed extension C' from bed B'.

Transverse bores 92 and 94 are located at the twelve o'clock and four o'clock positions in bodies 80. When the bed extension C' is in a horizontal position, it is so held by pins 96 that extend through the bores 84 and 92, as shown in FIGURE 7. The bed extension C' is held in the down position when pins 96 are projected through the bores 86 and 94.

The use and operation of the invention have been described herein, and accordingly need not be repeated.

Although the present invention is fully capable of achieving the objects and providing the advantages hereinbefore mentioned, it is to be understood that it is merely illustrative of the presently preferred embodiment thereof, and I do not mean to be limited to the details of construction herein shown and described, other than as defined in the appended claims.

I claim:
1. The combination with an automotive truck having a flat, rearwardly extending bed disposed above the chassis thereof, a bed extension structure behind said bed, which extension when in a first horizontal position cooperates with said bed to define a cargo carrying surface, yet when said bed extension is in a second inclined position it serves as ramp over which power equipment can move in loading or unloading the same from said bed, which bed extension comprises:
  (a) a first channel that includes a vertical web and rearwardly extending flanges, which channel is disposed transversely relative to the rear end of said bed;
  (b) first means for supporting said channel from said rear end of said bed;
  (c) a plurality of transversely aligned, spaced first tubular sections secured to said channel and partially disposed between said flanges;
  (d) a plurality of transversely aligned second tubular sections positioned between said first sections;
  (e) a rectangular, rigid extension having a flat load-supporting surface, to the forward edge of which extension said second tubular sections are secured, with said extension being located rearwardly of said bed;
  (f) a pin that engages said first and second tubular sections;
  (g) second means for selectively supporting said bed extension in said first position; and
  (h) third means pivotally connected to said extension for selectively supporting said extension in said second position in a condition to permit a heavy load to move thereover.

2. The combination as defined in claim wherein said first means comprises:
  (i) at least two parallel, laterally spaced first rigid members secured to the under surface of said bed, the rear ends of which members are in abutting contact with said web of said first channel and secured thereto.

3. The combination as defined in claim 2 whereby said extension includes:
  (j) a second channel having a web from which two flanges project forwardly, with said flanges being secured to said second tubular sections;
  (k) a plurality of parallel laterally spaced second rigid members that extend rearwardly from said second channel;
  (l) a plurality of longitudinally spaced, transversely positioned reinforcing members supported from said second members; and
  (m) a load-supporting surface member of substantially the same width as that of said bed, mounted on the upper surfaces of said reinforcing members.

4. The combination as defined in claim 2 wherein said second means includes:
  (j) two parallel plates projecting upwardly from the rear side portions of said bed, in which plates first and second spaced pairs of transversely aligned first openings are formed;
  (k) two side walls that extend upwardly from said extension and are so laterally spaced that forward portions thereof are disposed adjacent to said plates, and a first pair of transversely aligned second openings are formed in said walls; and
  (l) two movable pins, which when in engagement with said first pair of said first openings and said second pair of said second openings support said bed extension structure in said first position, and which pins when in engagement with said second pair of said first openings and said second pair of said second openings, support said bed extension in said second position.

5. The combination as defined in claim 4 wherein said third means includes:
(m) two laterally spaced, downwardly extending brackets secured to the rear potrion of said chassis;
(n) two lugs extending rearwardly from said brackets, in which lugs a pair of transversely aligned third openings are formed;
(o) two laterally spaced legs pivotally supported by two of said second rigid members, in which legs a pair of fourth openings are formed in the free end portions thereof that are transversely alignable with said third openings when said extension is in said second position;
(p) two second pins for removably engaging said third and fourth openings when said extension is in said second position; and
(q) fourth means for removably supporting said legs substantially parallel relative to said second members.

6. The combination as defined in claim 5 wherein said fourth means includes:
(r) two second lugs that occupy fixed positions relative said second members and are laterally spaced therefrom, in which second lugs fifth openings are formed with which said fourth openings can be brought into transverse alignment, and with said fourth and fifth openings being engageable by said second pins to removably support said legs in substantially parallel positions relative to said second members.

References Cited
UNITED STATES PATENTS

| | | | |
|---|---|---|---|
| 2,650,727 | 9/1953 | Martin | 214—85 |
| 3,051,340 | 8/1962 | Ely | 214—85 XR |
| 3,142,394 | 7/1964 | Schwartz | 214—85 |

ALBERT J. MAKAY, *Primary Examiner.*